United States Patent Office 3,019,649
Patented Feb. 6, 1962

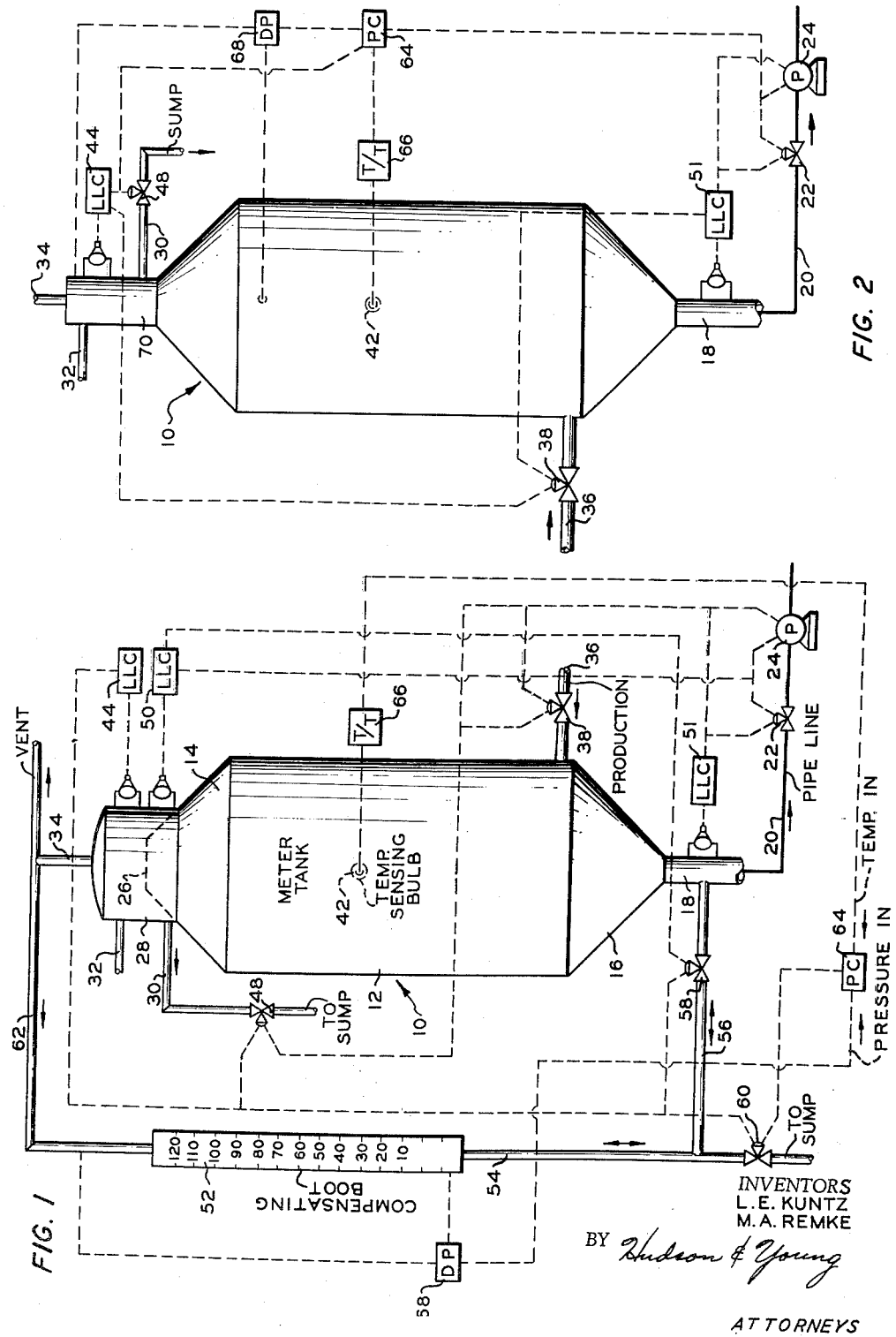

3,019,649
METERING SYSTEM FOR LIQUIDS
Louis E. Kuntz and Marvin A. Remke, Bartlesville, Okla., assignors to Phillips Petroleum Company, a corporation of Delaware
Filed Aug. 16, 1957, Ser. No. 678,609
10 Claims. (Cl. 73—223)

This invention relates to a system for repetitive metering of a constant amount of liquid. A specific aspect of the invention is concerned with the metering of crude oil to oil pipe lines.

The co-pending U.S. application of G. G. Hebard and M. A. Remke, S.N. 622,863, filed November 19, 1956, now U.S. Patent 2,893,595, discloses and claims a method and system for metering liquids and particularly crude oil from storage to pipe line and which automatically measures or meters a fixed volume of oil on each fill and dump of a metering tank. Since the temperature of the oil being metered changes from time to time, it is necessary to record the temperature of the oil before each dump and once each day, for accounting purposes, a record of tank dumps and oil temperatures is utilized to correct each dump to its equivalent volume at 60° F., which is the accepted standard temperature at which oil volumes are calculated for sale in the petroleum industry. The present invention is concerned with a system which automatically varies the volume of oil per tank in accordance with the oil temperature so that each dump contains the equivalent of a fixed volume corrected to 60° F.

Accordingly, it is an object of the invention to provide a system for metering at different temperatures varying volumes of liquid which are equal to a fixed volume at a standard temperature. Another object is to provide a system which automatically meters a measured volume of liquid which corrects to a fixed volume at a standard temperature. A further object is to provide an improved apparatus for metering crude oil at different temperatures to a pipe line from a given source of supply such as a storage tank battery. Other objects of the invention will become apparent upon consideration of the accompanying disclosure.

The invention may be best understood by reference to the schematic drawing attached hereto of which FIGURE 1 is an elevation of a metering tank system and arrangement of apparatus in accordance with the invention; and FIGURE 2 is a similar view of another embodiment of the invention.

Referring to FIGURE 1, an upright cylindrical metering tank 10 comprises a cylindrical section 12, a frusto-conical top closure 14 and a frusto-conical bottom closure 16. Bottom closure 16 converges to an outlet line 18 which leads to a pump line 20 in which is positioned a motor valve 22 and a pump 24. Top closure member 14 terminates at its upper end in a horizontal aperture 26 which provides an overflow weir for liquids pumped into the tank. An overflow vessel or receiver 28 of slightly larger horizontal cross section than the area of aperture 26 encloses the upper open end of the tank (aperture 26), extending from a level below to a level above the level of the aperture. Overflow receiver 28 is provided with a drain line 30 and an overflow line 32, as well as a gas vent 34.

Tank 10 is also provided with an inlet line 36 in which is positioned a motor valve 38. A temperature sensing device 42 is also provided in an intermediate section of the tank for ascertaining the temperature of the liquid being metered.

A liquid level controller 44 is sensitive to a liquid level in overflow vessel 28 and operates when the liquid level therein reaches a desired selected level anywhere above the level of aperture 26 and below the level of outlet line 32, closing motor valve 38 when said level is reached. Controller 44 also actuates motor valve 48 in line 30 to open the same and allow liquid to drain down in vessel 28 to a level below the level of aperture 26. A second liquid level controller 50 is sensitive to a liquid level in overflow vessel 28 below aperture 26 so that when the liquid is drained down to the level below said aperture, controller 50 closes motor valve 48 and opens motor valve 22 in line 20. This controller may also actuate the switch on pump 24 so as to start the pump and drain the tank to the desired level.

When the liquid in tank 10 has been drained to a desired level, such as a level in upright conduit 18, a level sensing device 51 therein operates motor valve 22 thereby closing the same and also may shut off pump 24 thereby preparing the system for a refill of tank 10. The entire operation of the controls may be effected from a control panel (not shown) which together with specific control features are the subject of a copending application of M. A. Remke et al., Serial No. 686,255, filed September 25, 1957. S.N. 686,255 has been replaced by a continuation-in-part application, S.N. 755,851, filed on August 18, 1958, which is now Patent No. 2,940,593. The tank structure of FIGURE 1 is disclosed and claimed in the copending application of G. G. Hebard and M. A. Remke, Serial No. 622,863, filed November 19, 1956 (now U.S. Patent 2,893,595).

A boot or auxiliary metering vessel 52 in the form of a cylinder of small horizontal cross-sectional area relative to tank 10 is connected by lines 54 and 56 with tank 10 thru outlet 18. A motor valve 58 in line 56 and a motor valve 60 in line 54 control flow thru these lines as hereinafter described. Boot 52 is vented thru line 62 which may join vent 34 from tank 10. A pressure controller 64 is operatively connected with temperature transmitter 66 and with differential pressure instrument 68 and is in control of motor valve 60 in line 54. Temperature transmitter 66 is actuated by temperature sensing instrument 42 and transmits a signal to pressure controller 64 which sets this instrument for a pressure differential so that when this pressure differential is sensed by instrument 68 a signal is transmitted to motor valve 60 which closes this valve and leaves a level of oil or other liquid in boot 52 which compensates the volume of oil in tank 10 at the temperature sensed therein and provides a total oil dump which when corrected to the 60° F. temperature is a fixed volume of oil. Boot 52 is calibrated in degrees F. from 10 to 120°. When the system is filled to the 60° mark with oil at 60° F. the total dump is the fixed volume to which the delivered volume (at any temperature in the range of 10 to 120° F.) converts at the standard temperature of 60° F. The calibration on cylinder 52 is readily reducible to a specific number of inches per F. degree variation in oil temperature.

To illustrate operation of the system of FIGURE 1, all of the valves except valve 48 are closed, this valve being open to drain off liquid remaining in overflow vessel 28. As the operating sequence commences after the aforesaid drainoff, fill valve 38 and boot valve 58 are opened and sump valve 48 is closed. Upon opening valve 38, oil to be metered is forced thru line 36 into metering tank 10 and compensating boot 52 until the oil reaches the level of LLC44. This actuates LLC44 which closes fill valve 38, to which it is operatively connected thru valve 48, as shown, and boot valve 58 to which it is connected directly. LLC44 then opens drain valve 48 and drain-down valve 60 in line 54 both of which are connected therewith. While the tank was filling, the oil temperature was established by temperature sensing device 42 and its output actuated temperature transmitter 66 which in turn actuated pressure controller 64 to position the set point on this pressure controller for the temperature sensed, so that when valve 60 opens, the level of oil in boot 52 drops until the pressure differential between the two selected points, one in the lower portion of the boot and the other above the boot, is such that the volume of oil remaining in the boot and in connecting line 56 to the level of level controller 51 when added to the volume remaining in tank 10 is a total volume which corrects to a fixed volume of oil at a standard temperature (such as 60° F.). Instrument 64 closes valve 60 when this differential pressure is reached.

Upon actuation of liquid level controller 44 and opening of sump valve 48, the liquid in receiver 28 drops to a level below weir 26, such as the level of liquid level controller 50. This leaves a constant volume of liquid in tank 10 which is now full exactly to the weir level. When the oil level reaches LLC 50 this instrument actuates motor valve 22 and may also actuate pump 24 to drain the metering tank down to the level of LLC 51. However valve 22 is prevented from opening by electrical or mechanical interlocks until valve 60 is closed. At the same time LLC 50 opens valve 58 to permit draining out the oil or other liquid from boot 52 so as to add the proper amount of oil to the oil drained from the tank to provide a volume of oil at the operating temperature which corrects to the fixed volume at standard temperature. Valve 48 is then opened to drain the residual oil from overflow vessel 28. This operation ends a cycle of filling and dumping of the metering system and the control panel then starts another cycle.

Each tank dump is registered on an electrically operated counter and for a given period of time the number of dumps multiplied by the fixed volume of the compensated meter tank equals the total temperature-corrected volume of oil transferred. To illustrate, if the metering tank 10 filled to weir 26 plus the volume of oil in boot 52 up to the 60° level is equal to 100 barrels, the system delivers 100 barrels of oil on every dump when corrected to 60° F. temperature.

In FIGURE 2 corresponding parts and elements are correspondingly numbered to those in FIGURE 1. In this embodiment of the invention a tank extension 70 functions in the same manner as compensating boot 52 in FIGURE 1. This tank extension is likewise of small horizontal cross-sectional area compared to tank 10 and is of sufficient length to adequately compensate the volume of oil in the tank for a wide range of temperature above and below 60° F. Tank extension 70 may be calibrated in degrees as shown on boot 52 with the 60° mark at an intermediate level on the device. Operation of the system of FIGURE 2 is similar to that of FIGURE 1 but is somewhat more simple. To start the cycle, fill valve 38 is opened and valves 48 and 22 are closed. When the level of liquid in the tank rises into the tank extension 70 and reaches the level of LLC 44 this instrument closes valve 38 and opens valve 48. During the filling of the tank, instrument 42 senses the temperature and the sensed temperature is transmitted by instrument 66 to pressure controller 64 which is thereby set for the proper differential pressure between the selected levels in the tank extension to accurately compensate the volume of the tank with the volume of oil in the tank extension when lowered to the level at which instrument 64 is automatically set to operate. When the level of oil in tank extension 70 drops to the set level (or pressure differential) pressure differential instrument 68 actuates pressure controller 64 which in turn closes valve 48 and opens valve 22 and may also simultaneously throw the switch on the motor of pump 24. Opening of valve 22 drains the liquid from tank 10 and tank extension 70 to the level of LLC 51 at which time this instrument closes valve 22, shuts off pump 24, and opens valve 38 to initiate another cycle.

For a 50 barrel volume of .8132 specific gravity crude (42.5° API) the data in the following table are applicable.

Table

| Temp., ° F. | Factor for Reducing Vol. to 60° F. | bbl. of 60° F. oil in 50 bbl. tank | bbl. above and below 60° Mark |
|---|---|---|---|
| 20 | 1.0199 | 50.9950 | −.9950 |
| 30 | 1.0149 | 50.7450 | −.7450 |
| 40 | 1.0099 | 50.4950 | −.4950 |
| 50 | 1.0050 | 50.2500 | −.2500 |
| 60 | 1.0000 | 50.0000 | 0 |
| 70 | 0.9950 | 49.7500 | +.2500 |
| 80 | 0.9901 | 49.5050 | +.4950 |
| 90 | 0.9851 | 49.2550 | +.7450 |
| 100 | 0.9801 | 49.0050 | +.9950 |
| 110 | 0.9751 | 48.7550 | +1.2450 |
| 120 | 0.9702 | 48.5100 | +1.4900 |

It can be read from the table that the total minimum barrels to be contained in the tank extension to compensate over a range of 20 to 120° F. is 1.49+.9950 or a total of 2.4850 barrels (104.37 gallons). The change in volume with temperature is linear, therefore, the rise of the oil in the tank extension neck is linear with temperature. Over the 100° F. range from 20 to 120° F. the change is 1.0437 gallons per degree F. and with a given cross-section of area in the tank extension the calibration thereof in degrees Fahrenheit is readily accomplished.

For a 50 barrel tank surmounted by a tank extension of 20" I.D. the minimum requirement in length is 6.4 feet, while on a 100 barrel tank the length of 20" tank extension or compensation boot required is 12.8 feet. Calculations for any size tank and tank extension or boot of appropriate cross section can be made to determine the height or length of the tank extension or boot and the number of inches of a given diameter pipe for each degree of temperature variation from 60° F. For a 50 barrel tank requiring 6.4 feet of tank extension or boot 20" in diameter between 20 and 120° of temperature change, .77 inch of oil in the tank extension or boot is equivalent to a temperature change of 1° F.

All of the instruments described herein are commercially available and do not, per se, constitute the invention. The boot shown in FIGURE 1 may, if desired, be located within tank 10. The calibration shown on boot 52 may be placed on a sight glass positioned adjacent the boot. However the boot cylinder may be constructed of transparent material such as polyolefin or Plexiglas. The tank may also be of spherical configuration.

Certain modifications of the invention will become apparent to those skilled in the art and the illustrative details disclosed are not to be construed as imposing unnecessary limitations on the invention.

We claim:

1. A metering system for accurately metering at varied liquid temperatures a fixed volume of liquid when corrected to a standard temperature, comprising a metering tank having a fixed full level, a valved inlet line, and a valved outlet line from the bottom section of said tank; an upright elongated vessel of small horizontal cross sectional area relative to said tank connected therewith so as to fill therefrom and drain thereinto, the volume of liquid in said tank filled to said fixed full level when added to the volume of liquid in said vessel filled to an intermediate level in accordance with the temperature of said liquid constituting said fixed volume at said standard temperature; a separate draindown line from the lower section of said vessel having a valve therein adapted to drain liquid from said vessel without affecting the liquid full level in said tank; and means for controlling the level of liquid in said vessel during draindown so as to provide the compensating volume of liquid in said vessel to give said fixed volume including temperature means for sensing the temperature of liquid in said tank, a pressure controller sensitive to said temperature sensing means operatively connected with the valve in said drain-down line so as to drain liquid from said vessel to a selected differential pressure in response to the sensed temperature, and a differential pressure sensing means sensitive to differential pressure between two selected levels in said vessel operatively connected with said pressure controller.

2. The system of claim 1 wherein said vessel is an extension on the upper end of said tank.

3. The metering system of claim 1 wherein said vessel is positioned laterally outside said tank and is connected therewith by a valved conduit.

4. The metering system of claim 1 wherein said vessel is an extension on the upper end of said tank and including a liquid level controller adapted to sense a level of liquid in an upper section of said vessel, close the valve in the inlet line to said tank, and open the valve in said drain-down line.

5. The metering system of claim 4 including a temperature transmitter connected with said temperature sensing means and with said pressure controller.

6. The metering system of claim 4 wherein said pressure controller is adapted to open the valve in the outlet line from said tank upon closing of the valve in said drain-down line and including liquid-level sensing means sensitive to a set minimum level in said tank and adapted to close the valve in said outlet line and open the valve in said inlet line.

7. A metering system for accurately metering at varied liquid temperatures a fixed volume of liquid when corrected to a standard temperature comprising in combination a metering tank having a horizontal overflow weir in its upper section; an overflow receiver for said weir; a valved inlet line for filling said tank; a valved outlet line for emptying said tank; a valved drain line for said receiver; a vertically elongated compensating boot connected by a valved line with said tank positioned so as to fill from said tank, said boot being sized so that when it is filled to an intermediate level with liquid and said tank is filled to said weir at a given temperature and the drain down volume of said boot is added to the drain down volume of said tank a fixed volume of liquid at a standard temperature is metered; a temperature sensing means in said tank; a pressure controller sensitive to said temperature sensing means; a differential pressure sensing means sensitive to differential pressure between two selected levels in said boot operatively connected with said pressure controller; a valved drain-down line from said boot independent of said tank, said pressure controller being operatively connected with the valve in said drain-down line so as to drain liquid from said boot to a selected differential pressure in response to the sensed temperature.

8. The metering system of claim 7 including means for sensing a liquid level in said receiver above the level of said weir and which, when said level is sensed, closes the valve in said inlet line, opens the valve in the drain line from said receiver, closes the valve in the line connecting said boot with said tank, and opens the valve in the line for lowering the liquid level in said boot; means for sensing a liquid level in said receiver below the level of said weir and which, when said level is sensed, opens the valve in said outlet line.

9. The metering system of claim 7 wherein said boot is calibrated in degrees F. above and below 60° F. to correspond with the levels of liquid therein which are required at different temperatures of the liquid in the tank to meter said fixed volume.

10. A metering system for accurately metering at varied liquid temperatures a fixed volume of liquid when corrected to a standard temperature, comprising a metering tank having a frusto-conical top forming a horizontal aperture to provide a fixed overflow-level, a valved inlet line, and a valved outlet line from the bottom section of said tank; an upright elongated vessel of small horizontal cross sectional area relative to said tank connected therewith so as to fill therefrom and drain thereinto, the volume of liquid in said tank filled to said fixed overflow level when added to the volume of liquid in said vessel filled to an intermediate level in accordance with the temperature of said liquid constituting said fixed volume at said standard temperature; a separate drain-down line from the lower section of said vessel disconnected from said tank and having a valve therein adapted to drain liquid from said vessel independent of the liquid level in said tank; means for sensing temperature of the liquid in said tank; means for sensing pressure differential between selected upper and lower levels of liquid in said vessel; and means sensitive to the sensed pressure differential and to the sensed temperature operatively connected with the valve in said draindown line adapted to close same to provide a compensating volume of liquid in said vessel to give said fixed volume at the sensed temperature.

References Cited in the file of this patent

UNITED STATES PATENTS

| 2,817,967 | Meyers | Dec. 31, 1957 |
| 2,831,350 | Banks et al. | Apr. 22, 1958 |
| 2,836,066 | Brown | May 27, 1958 |
| 2,872,817 | Pitts | Feb. 10, 1959 |
| 2,893,595 | Hebard et al. | July 7, 1959 |
| 2,914,946 | Pope et al. | Dec. 1, 1959 |

OTHER REFERENCES

Automatic Custody Transfer in Texas, The Oil and Gas Journal, July 30, 1956, pages 122–123. 73–224. (Copy in Div. 36.)